(12) United States Patent
Araki et al.

(10) Patent No.: US 11,855,564 B2
(45) Date of Patent: Dec. 26, 2023

(54) CONTROL DEVICE AND ELECTRIC VEHICLE

(71) Applicant: HITACHI, LTD., Tokyo (JP)

(72) Inventors: Takahiro Araki, Tokyo (JP); Daiki Komatsu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 218 days.

(21) Appl. No.: 17/611,301

(22) PCT Filed: Jul. 14, 2020

(86) PCT No.: PCT/JP2020/027404
§ 371 (c)(1),
(2) Date: Nov. 15, 2021

(87) PCT Pub. No.: WO2021/020115
PCT Pub. Date: Feb. 4, 2021

(65) Prior Publication Data
US 2022/0311370 A1    Sep. 29, 2022

(30) Foreign Application Priority Data
Jul. 26, 2019 (JP) .................................. 2019-137903

(51) Int. Cl.
*H02P 27/06* (2006.01)
*H02M 1/00* (2006.01)

(52) U.S. Cl.
CPC .......... *H02P 27/06* (2013.01); *H02M 1/0009* (2021.05)

(58) Field of Classification Search
CPC ........ H02P 27/06; H02M 1/00; H02M 1/0009
See application file for complete search history.

(56) References Cited

FOREIGN PATENT DOCUMENTS

JP    2007-068290 A    3/2007

OTHER PUBLICATIONS

International Search Report of PCT/JP2020/027404 dated Sep. 24, 2020.

*Primary Examiner* — Robert L Deberadinis
(74) *Attorney, Agent, or Firm* — MATTINGLY & MALUR, PC

(57) ABSTRACT

This control device for controlling an inverter circuit calculates an input current of the inverter circuit on the basis of an output current instruction value for controlling an output current of the inverter circuit, and calculates, on the basis of the calculated input current, an output voltage compensation amount according to the fluctuation amount of an input voltage of the inverter circuit.

7 Claims, 8 Drawing Sheets

FIG. 2
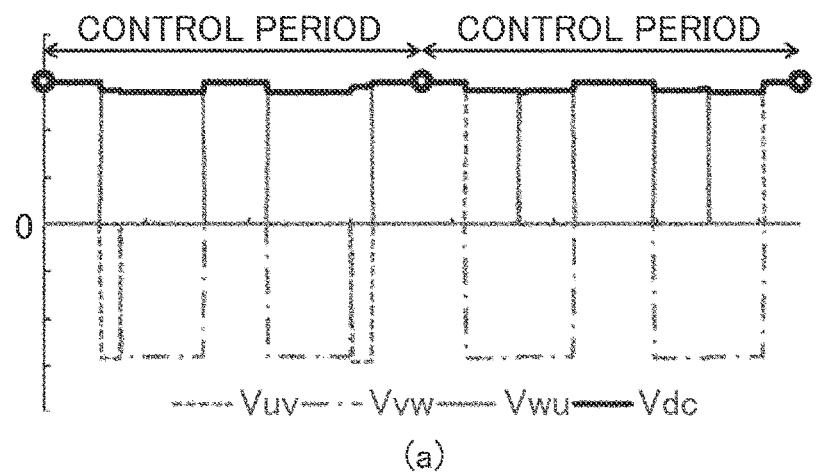
(a)
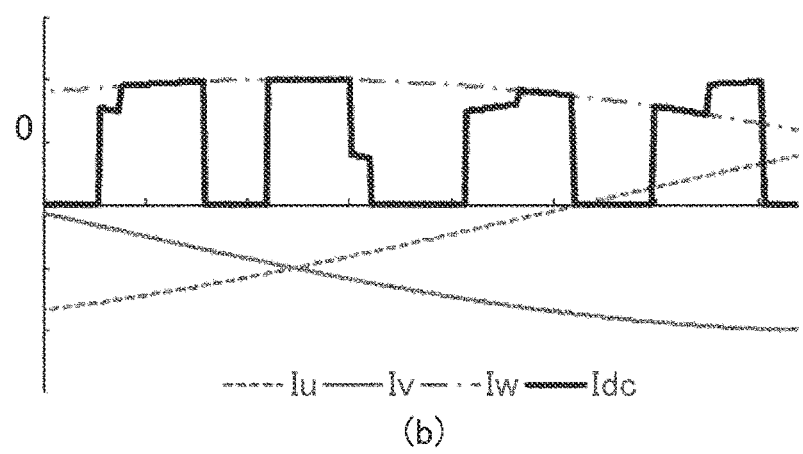
(b)

FIG. 5

| OUTPUT VOLTAGE VECTOR | U-PHASE | V-PHASE | W-PHASE | INPUT CURRENT $i_{dc}$ |
|---|---|---|---|---|
| $V_0$ | 0 | 0 | 0 | 0 |
| $V_1$ | 1 | 0 | 0 | $i_u$ |
| $V_2$ | 1 | 1 | 0 | $-i_w$ |
| $V_3$ | 0 | 1 | 0 | $i_v$ |
| $V_4$ | 0 | 1 | 1 | $-i_u$ |
| $V_5$ | 0 | 0 | 1 | $i_w$ |
| $V_6$ | 1 | 0 | 1 | $-i_v$ |
| $V_7$ | 1 | 1 | 1 | 0 |

CONTROL DEVICE AND ELECTRIC VEHICLE

TECHNICAL FIELD

The present invention relates to a control device of an inverter circuit and an electric vehicle including the control device.

BACKGROUND ART

The control device of an inverter circuit mounted on a hybrid automobile, an electric automobile, and the like is desired to be highly responsive. With respect to the request, there is proposed a technology for securing control responsiveness of the output voltage reflecting change in the internal resistance of DC power supply.

As a background art of the present technical field, Patent Literatures 1 is known. In Patent Literatures 1, it is described that an output voltage control system includes a feedback arithmetic unit executing feedback control using feedback gains from a feedback gain determination unit, the feedback control being for making deviation of the output voltage of the DC/DC converter to the target voltage to be zero, and the feedback gain determination unit determines the feedback gains so as to reflect change in internal resistance corresponding to the charging rate at a DC power supply (battery). Thus, control responsiveness of output voltage is secured properly reflecting change in the internal resistance of DC power supply.

CITATION LIST

Patent Literature

Patent Literature 1: JP-A No. 2007-068290

SUMMARY OF INVENTION

Technical Problem

According to the method described in Patent Literatures 1, there was a concern that, when the control deviation increased/decreased sharply, response of the feedback control amount delayed and sufficient response performance was not secured.

In view of the problem described above, the main object of the present invention is to improve the response performance of control of an inverter circuit.

Solution to Problem

A control device according to the present invention executes control of an inverter circuit, calculates input current of the inverter circuit based on an output current command value that is for controlling an output current of the inverter circuit, and calculates an output voltage compensation amount depending on a variation amount of an input voltage of the inverter circuit based on the input current calculated.

An electric vehicle according to the present invention includes the control device, an inverter circuit, and a motor, the inverter circuit being controlled by the control device and converting DC power to AC power, the motor being driven using the AC power outputted from the inverter circuit.

Advantageous Effects of Invention

According to the present invention, the response performance of control of the inverter circuit can be improved.

BRIEF DESCRIPTION OF DRAWINGS

FIG. 2 is a drawing showing an example of a waveform of input/output voltage and input/output current of an inverter circuit.

FIG. 5 is a table showing the relation between output voltage vector $V_x$ and input current $i_{dc}$.

DESCRIPTION OF EMBODIMENTS

Figure 1:
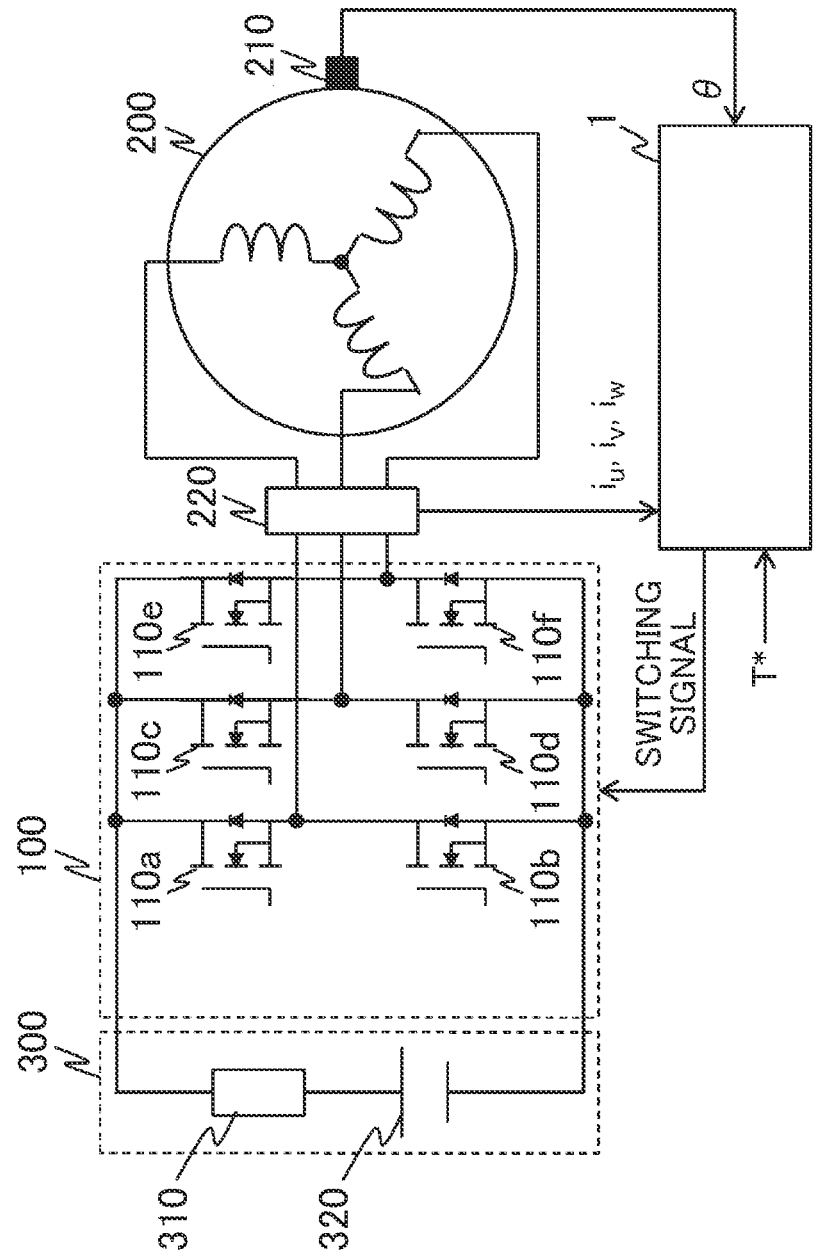
FIG. 1 is a drawing showing a configuration of a motor drive system including a control device related to the first embodiment of the present invention.

Embodiments of the present invention will be hereinafter explained referring to the drawings. However, the present invention is not to be interpreted to be limited to the embodiments described below, and technological thoughts of the present invention may be achieved combining known other configuration elements. Also, in each drawing, identical elements will be marked with a same reference sign and duplicated explanation thereof will be omitted.

First Embodiment

FIG. 1 is a drawing showing a configuration of a motor drive system including a control device related to the first embodiment of the present invention. The motor drive system shown in FIG. 1 includes an inverter circuit 100, a control device 1 for controlling the inverter circuit 100, a motor 200, a position sensor 210, a current sensor 220, and a DC power supply 300.

The motor 200 is a three-phase AC motor, and is driven using three-phase AC power outputted from the inverter circuit 100.

The position sensor 210 detects the position of a rotor of the motor 200, and outputs rotor position θ detected.

The current sensor 220 detects current of each phase flowing through the motor 200, and outputs three-phase current values $i_u$, $i_v$, $i_w$ detected.

The control device 1 executes PWM control that is for controlling the inverter circuit 100 based on a torque command T* outputted from the outside, the three-phase current values $i_u$, $i_v$, $i_w$ detected by the current sensor 220, and the rotor position θ detected by the position sensor 210. Thus, the control device 1 generates a switching signal that is for controlling respective switching elements included in the inverter circuit 100, and outputs the switching signal to the inverter circuit 100. Also, the detail of the PWM control executed by the control device 1 will be described below.

The inverter circuit 100 includes switching elements 110a to 110f. The switching elements 110a is arranged in the U-phase upper arm, the switching elements 110b is arranged in the U-phase lower arm, the switching elements 110c is arranged in the V-phase upper arm, the switching elements 110d is arranged in the V-phase lower arm, the switching elements 110e is arranged in the W-phase upper arm, and the switching elements 110f is arranged in the W-phase lower arm respectively. The switching elements 110a to 110f are configured respectively by combining a semiconductor element and a diode, the semiconductor element being capable of on/off operation such as a metal oxide semiconductor field effect transistor (MOSFET) and an insulated gate bipolar transistor (IGBT) for example.

The switching elements 110a to 110f are turned on or off individually based on a switching signal inputted from the control device 1, and convert DC power supplied from the DC power supply 300 to three-phase AC power. U-phase AC power is generated by the switching elements 110a, 110b, V-phase AC power is generated by the switching elements 110c, 110d, and W-phase AC power is generated by the switching elements 110e, 110f respectively. The three-phase AC power generated thus is outputted from the inverter circuit 100 to a stator of the motor 200, and generates three-phase AC current in the motor 200. This three-phase AC current generates a rotating magnetic field in the motor 200, thereby the rotor rotates and the motor 200 is driven.

The DC power supply 300 is connected to an input terminal of the inverter circuit 100, and supplies DC power required for driving the motor 200. The DC power supply 300 includes an internal resistance 310 and a voltage supply 320. DC voltage applied from the DC power supply 300 to the inverter circuit 100 changes according to the state of the DC power supply 300. For example, when the DC power supply 300 is a secondary battery such as a lead-acid storage battery and a lithium-ion battery, since the voltage of the voltage supply 320 changes according to the charging rate of the DC power supply 300, the output voltage of the DC power supply 300 also changes. Further, when current flows through the DC power supply 300, voltage drop according to a resistance value $R_{ESR}$ of the internal resistance 310 is generated, and the output voltage of the DC power supply 300 thereby changes. Since this resistance value $R_{ESR}$ generally changes according to the temperature, variation occurs in the output voltage of the DC power supply 300 also by the internal temperature of the DC power supply 300.

FIG. 2 is a drawing showing an example of a waveform of input/output voltage and input/output current of the inverter circuit 100. FIG. 2 (a) expresses an example of DC input voltage $V_{dc}$ and line output voltage $v_{uv}$, $v_{vw}$, $v_{wu}$ of each phase of the inverter circuit 100, and FIG. 2 (b) expresses an example of DC input current $i_{dc}$ and output current $i_u$, $i_v$, $i_w$ of each phase of the inverter circuit 100. Also, the interval between each point set at an equal interval on the input voltage $V_{dc}$ in FIG. 2 (a) corresponds to the control frequency of the inverter circuit 100 by the control device 1.

To the inverter circuit 100, input voltage $V_{dc}$ according to the output voltage of the DC power supply 300 is applied. At this time, as shown in FIG. 2, the input voltage $V_{dc}$ of a period when input current $i_{dc}$ does not flow through the inverter circuit 100 is same to the voltage of the voltage supply 320 of a case of opening the output terminal of the DC power supply 300. On the other hand, the input voltage $V_{dc}$ of a period when the input current $i_{dc}$ flows through the inverter circuit 100 drops compared to that in the period when the input current $i_{dc}$ does not flow through the inverter circuit 100 due to the voltage drop according to the resistance value $R_{ESR}$ of the internal resistance 310 described above. As a result, in the period when the input current $i_{dc}$ flows through the inverter circuit 100, the amplitude of the line output voltage $v_{uv}$, $v_{vw}$, $v_{wu}$ of each phase also lowers. This event becomes conspicuous as the capacitance of a smoothing capacitor mounted on the inverter circuit 100 is smaller.

In a control device of an inverter circuit according to a prior art, the fact that the amplitude of the line output voltage $v_{uv}$, $v_{vw}$, $v_{wu}$ of each phase changes according to presence/absence of the input current of the inverter circuit as described above has not been considered. Therefore, the inverter circuit could not output voltage in accordance with the command value form the control device, and there was a concern of causing deterioration of response performance and instability of control. On the other hand, in the embodiment of the present invention described below, in the control device 1, the response performance is improved than before by applying the control considering the point described above to the inverter circuit 100.

Figure 3:
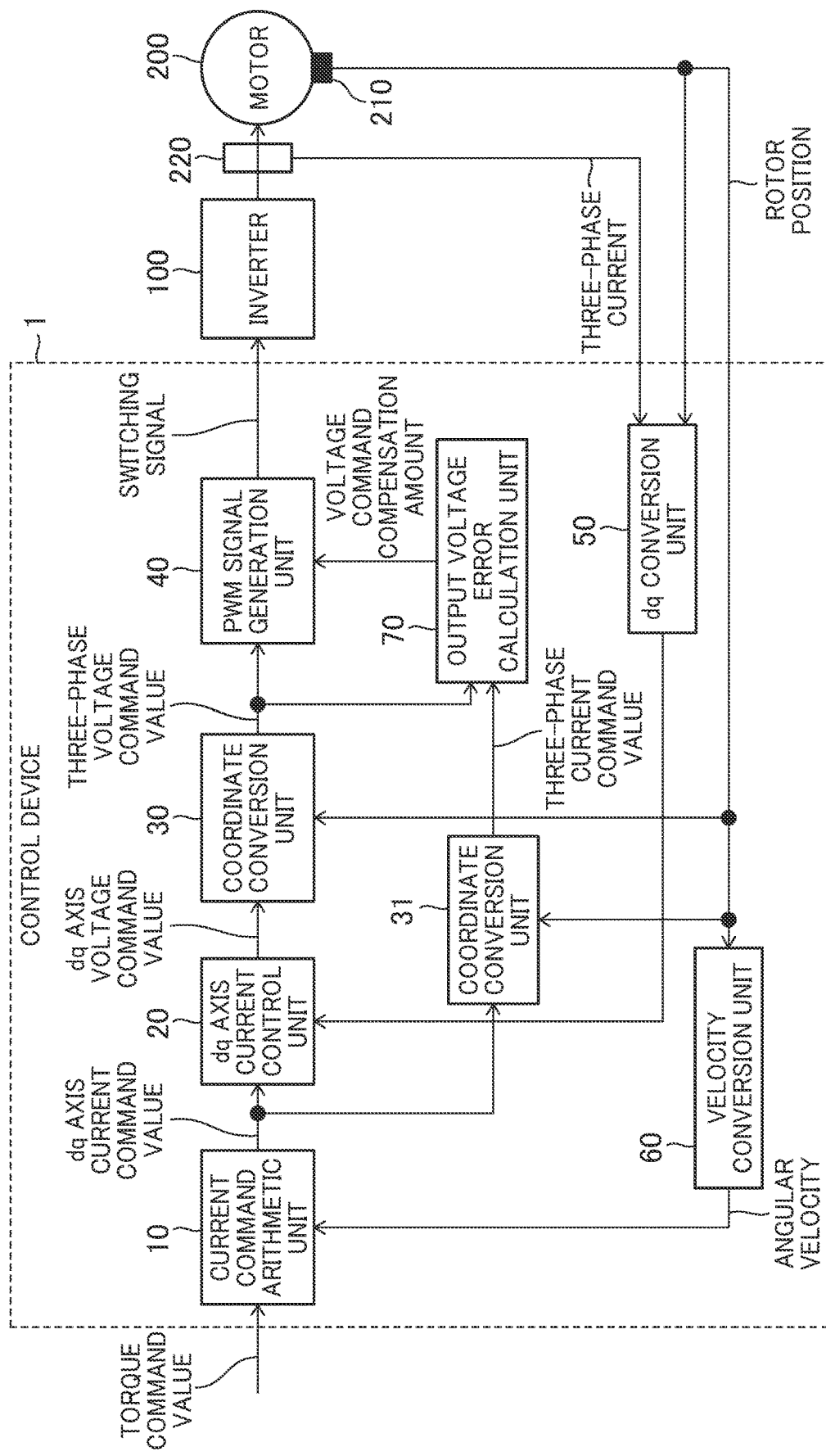
FIG. 3 is a block diagram showing a functional configuration of the control device related to the first embodiment of the present invention.

FIG. 3 is a block diagram showing a functional configuration of the control device 1 related to the first embodiment of the present invention. In FIG. 3, the control device 1 includes respective functional blocks of a current command arithmetic unit 10, a dq axis current control unit 20, coordinate conversion units 30, 31, a PWM signal generation unit 40, a dq conversion unit 50, a velocity conversion unit 60, and an output voltage error calculation unit 70. The control device 1 is configured of a microcomputer for example, and can achieve these functional blocks by executing a predetermined program in the microcomputer. Alternatively, a part or all of these functional blocks may be achieved by using a hardware circuit such as a logic IC and an FPGA.

The current command arithmetic unit 10 calculates a d-axis current command value $i_d^*$ and a q-axis current command value $i_q^*$ which are for controlling the output current of the inverter circuit 100 based on the torque command value T* inputted and an angular velocity ω calculated by the velocity conversion unit 60.

To the dq axis current control unit 20, there are inputted difference of the d-axis current command value $i_d^*$ calculated by the current command arithmetic unit 10 and a d-axis current detection value $i_d$ outputted from the dq conversion unit 50 based on the three-phase current $i_u$, $i_v$, $i_w$ detected by the current sensor 220 and difference of the q-axis current command value $i_q^*$ calculated by the current command arithmetic unit 10 and a q-axis current detection value $i_q$ outputted from the dq conversion unit 50 based on the three-phase current $i_u$, $i_v$, $i_w$ detected by the current sensor 220. The dq axis current control unit 20 calculates a d-axis voltage command value $v_d^*$ and a q-axis voltage command value $v_q^*$ by executing proportional control and integral control based on a predetermined control gain command value based on the respective differences having been inputted.

To the coordinate conversion unit 30, there are inputted the d-axis voltage command value $v_d^*$ and the q-axis voltage command value $v_q^*$ calculated by the dq axis current control unit 20 and the rotor position θ detected by the position sensor 210. The coordinate conversion unit 30 outputs a U-phase voltage command value $v_u^*$, a V-phase voltage command value $v_v^*$, and a W-phase voltage command value $v_w^*$ by subjecting the d-axis voltage command value $v_d^*$ and the q-axis voltage command value $v_q^*$ to rotated coordinate conversion based on the rotor position θ.

To the coordinate conversion unit 31, there are inputted the d-axis current command value $i_d^*$ and the q-axis current command value $i_q^*$ calculated by the current command arithmetic unit 10 and the rotor position θ detected by the position sensor 210. The coordinate conversion unit 31 outputs a U-phase current command value $i_u^*$, a V-phase current command value $v_v^*$, and a W-phase current command value $i_w^*$ by subjecting the d-axis current command value $i_d^*$ and the q-axis current command value $i_q^*$ to rotated coordinate conversion based on the rotor position θ.

To the PWM signal generation unit 40, there are inputted the U-phase voltage command value $v_u^*$, the V-phase voltage command value $v_v^*$, and the W-phase voltage command value $v_w^*$ outputted from the coordinate conversion unit 30 based on the d-axis voltage command value $v_d^*$ and the q-axis voltage command value $v_q^*$ calculated by the dq axis current control unit 20 and a U-phase voltage command compensation amount $V_{ucomp}$, a V-phase voltage command compensation amount $V_{vcomp}$, and a W-phase voltage command compensation amount $V_{wcomp}$ calculated by the output voltage error calculation unit 70. Based on a sum of these voltage command values and the voltage command compensation amounts of each of the U, V, and W phases, the PWM signal generation unit 40 generates a switching signal (PWM signal) which is for controlling turning on/off of the switching elements 110a to 110f of each phase included in the inverter circuit 100. Thus, with respect to each of the U, V, and W phases, the voltage command values $v_u^*, v_v^*, v_w^*$ are subjected to compensation respectively based on the voltage command compensation amounts $V_{ucomp}, V_{vcomp}, V_{wcomp}$ and the switching signal is generated. Therefore, feedforward compensation of the output voltage command value with respect to the inverter circuit 100 can be achieved.

To the dq conversion unit 50, there are inputted the three-phase current $i_u, i_v, i_w$ detected by the current sensor 220 and the rotor position θ detected by the position sensor 210. Based on these values having been inputted, the dq conversion unit 50 outputs the d-axis current detection value $i_d$ and the q-axis current detection value $i_q$.

To the velocity conversion unit 60, the rotor position θ detected by the position sensor 210 is inputted. The velocity conversion unit 60 outputs the angular velocity ω based on the rotor position θ, the rotor of the motor 200 rotating with the angular velocity ω.

To the output voltage error calculation unit 70, there are inputted the U-phase current command value $i_u^*$, the V-phase current command value $i_v^*$, and the W-phase current command value $i_w^*$ outputted from the coordinate conversion unit 31 based on the d-axis current command value $i_d^*$ and the q-axis current command value $i_q^*$ calculated by the current command arithmetic unit 10 and the U-phase voltage command value $v_u^*$, the V-phase voltage command value $v_v^*$, and the W-phase voltage command value $v_w^*$ outputted from the coordinate conversion unit 30 based on the d-axis voltage command value $v_d^*$ and the q-axis voltage command value $v_q^*$ calculated by the dq axis current control unit 20. Based on these values having been inputted, the output voltage error calculation unit 70 calculates the U-phase voltage command compensation amount $V_{ucomp}$, the V-phase voltage command compensation amount $V_{ucomp}$, and the W-phase voltage command compensation amount $V_{wcomp}$ according to the variation amount of the input voltage $V_{dc}$ of the inverter circuit 100. Also, with respect to the calculation method of the voltage command compensation amounts $V_{ucomp}, V_{vcomp}, V_{wcomp}$ of each of the U, V, and W phases by the output voltage error calculation unit 70 will be explained below referring to FIGS. 4, 5, and 6.

Figure 4:
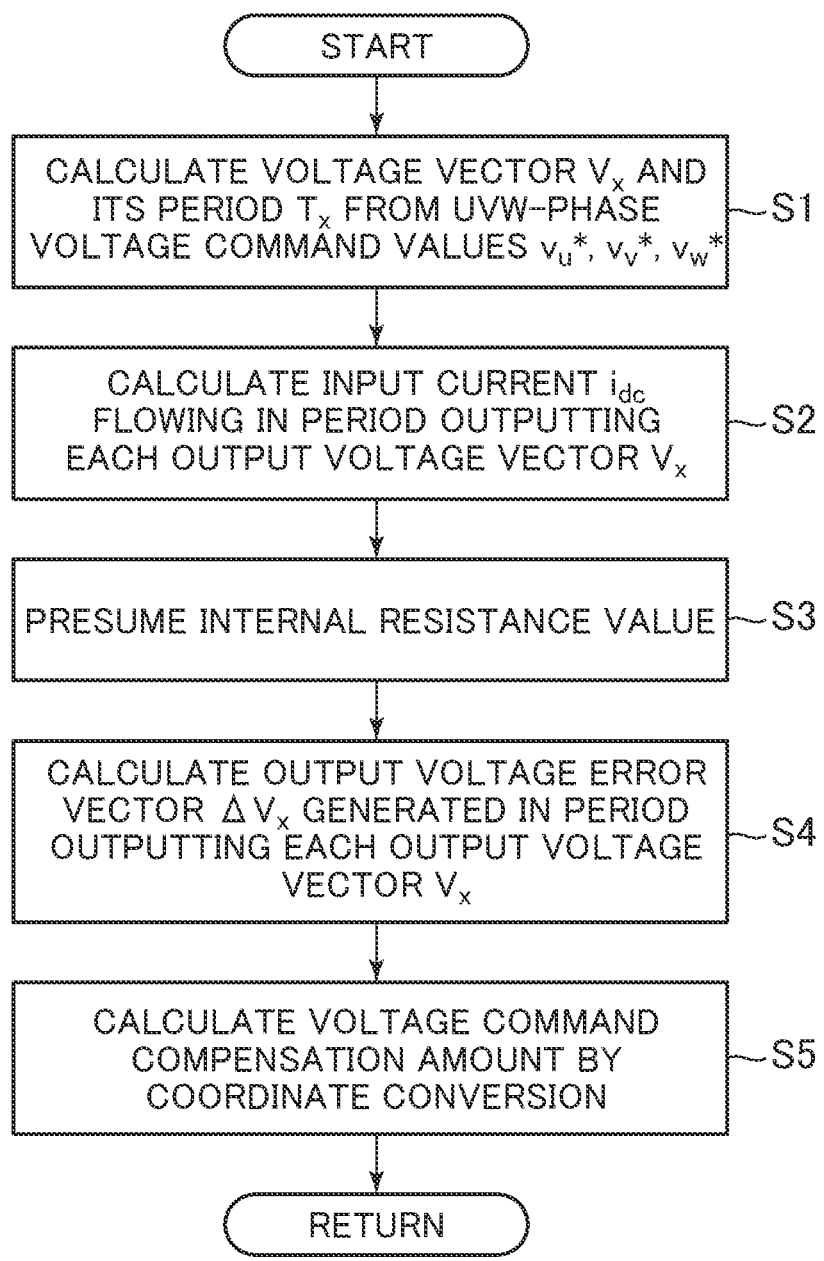
FIG. 4 is a flowchart showing a process procedure of an output voltage error calculation unit.

FIG. 4 is a flowchart showing a process procedure of the output voltage error calculation unit 70.

First, in step S1, the output voltage error calculation unit 70 calculates the output voltage vector $V_x$ according to the state of the switching elements 110a to 110f of the inverter circuit 100 from the voltage command values $v_u^*, v_v^*, v_w^*$ of each of the U, V, and W phases having been inputted and a period $T_x$ of each output voltage vector $V_x$. The output voltage vector $V_x$ is one obtained by expressing the combination of the switching elements 110a to 110f each of which being in a state of being turned on or off using 8 kinds of vector (x=0 to 7). This can be obtained by a known method such as the space vector modulation.

Next, in step S2, the output voltage error calculation unit 70 calculates the input current $i_{dc}$ flowing through the inverter circuit 100 from the DC power supply 300 for each output voltage vector $V_x$ calculated in step S1 and the period $T_x$ when each output voltage vector $V_x$ is outputted from the current command values $i_u^*, i_v^*, i_w^*$ of each of the U, V, and W phases having been inputted. Here, the input current $i_{dc}$ corresponding to each output voltage vector $V_x$ is calculated by referring a table shown in FIG. 5 described below for example.

Next, in step S3, the output voltage error calculation unit 70 presumes the resistance value $R_{ESR}$ of the internal resistance 310 included in the DC power supply 300. Here, for example, by setting beforehand table data determining the internal resistance value for each state of the DC power supply 300 and referring to these table data, the resistance value $R_{ESR}$ corresponding to the present state of the DC power supply 300 can be presumed. When the DC power supply 300 is a secondary battery such as a lead-acid storage battery and a lithium-ion battery for example, the output voltage of the DC power supply 300 changes according to the charging rate and the internal temperature as described above. Therefore, by setting beforehand corresponding internal resistance value as the table data for each of the charging rate and the internal temperature of the DC power supply 300, an appropriate resistance value $R_{ESR}$ can be presumed based on these table data.

Thereafter, in step S4, the output voltage error calculation unit 70 calculates the output voltage error vector $\Delta V_x$ according to the error of the output voltage of the inverter circuit 100 generated due to the variation of the input voltage $V_{dc}$ for each period $T_x$ when each output voltage vector $V_x$ is outputted. Here, the output voltage error vector $\Delta V_x$ is calculated by the expression (1) below for example. In the expression (1), $R_{ESR}$ expresses the resistance value of the internal resistance 310 presumed in step S3, and $i_{dc}$ expresses the input current calculated in step S2. Also, the direction of the output voltage error vector $\Delta V_x$ obtained by the expression (1) is defined to be opposite of that of the output voltage vector $V_x$.

$$\Delta V_x = R_{ESR} \times i_{dc} \times T_x \ (x=0,1,2,3,4,5,6,7) \quad (1)$$

Further, with respect to the output voltage error vector $\Delta V_x$ calculated in step S4, the calculation accuracy of it can be improved by executing the calculation repeatedly.

Lastly, in step S5, the output voltage error calculation unit 70 calculates the voltage command compensation amounts $V_{ucomp}, V_{vcomp}, V_{wcomp}$ of each of the U, V, and W phases by subjecting the output voltage error vector $\Delta V_x$ calculated in step S4 to coordinate conversion to a three-phase voltage value. Thus, with respect to each combination of the state of turning on or off of the switching elements 110a to 110f of each of the U, V, and W phases included in the inverter circuit 100, the variation amount of the input voltage $V_{dc}$ to the inverter circuit 100 is calculated, and the voltage command compensation amounts $V_{ucomp}$, $V_{vcomp}$, $V_{wcomp}$ for the output voltage are calculated.

FIG. 5 is a table showing the relation between the output voltage vector $V_x$ and the input current $i_{dc}$ used when the output voltage error calculation unit 70 calculates the input current $i_{dc}$ in step S2 described above. In the table of FIG. 5, with respect to each of 8 kinds of the output voltage vector $V_x$ (x=0 to 7), the on/off state of the switching element of each of the U, V, and W phases is shown, and the correspondence relation of the phase current and the input current $i_{dc}$ is shown. Also, in FIG. 5, the on/off state of the switching element of each of the U, V, and W phases is expressed by "0" or "1". "0" expresses the state that the upper arm switching element of a phase in question is turned off and the lower arm switching element of the phase in question is turned on, and "1" expresses the state that the upper arm switching element of a phase in question is turned on and the lower arm switching element of the phase in question is turned off.

In the $V_0$ vector period when the lower arm switching elements of all phases are turned on, the output currents $i_u$, $i_v$, $i_w$ of three phases recirculate without going through the DC power supply 300. Therefore, as shown in the table of FIG. 5, the input current $i_{dc}$ becomes 0. In the $V_1$ vector period when only the upper arm switching element of the U phase is turned on, all of the input current $i_{dc}$ flows in to the U phase in the inverter circuit 100. Therefore, as shown in the table of FIG. 5, $i_{dc}=i_u$ is effected. In the $V_2$ vector period when the upper arm switching elements of the U phase and the V phase are turned on and the upper arm switching element of the W phase is turned off, the W phase current $i_w$ flows toward the DC power supply 300 from the inverter circuit 100. Therefore, as shown in the table of FIG. 5, $i_{dc}=-i_w$ is effected.

In the period when other voltage vectors are outputted, in a similar manner, the input current $i_{dc}$ of the inverter circuit 100 can be obtained by any one of the output currents $i_u$, $i_v$, $i_w$ of three phases. Here, in the control block diagram of FIG. 3, it is configured that the output voltage error calculation unit 70 presumes the output currents $i_u$, $i_v$, $i_w$ in the next control period using the current command values $i_u^*$, $i_v^*$, $i_w^*$ of each of the U, V, and W phases outputted from the coordinate conversion unit 31 by calculating, with the current command arithmetic unit 10, the d-axis current command value $i_d^*$ and the q-axis current command value $i_q^*$, and calculates the input current $i_{dc}$ in the next control period using them.

Figure 6:
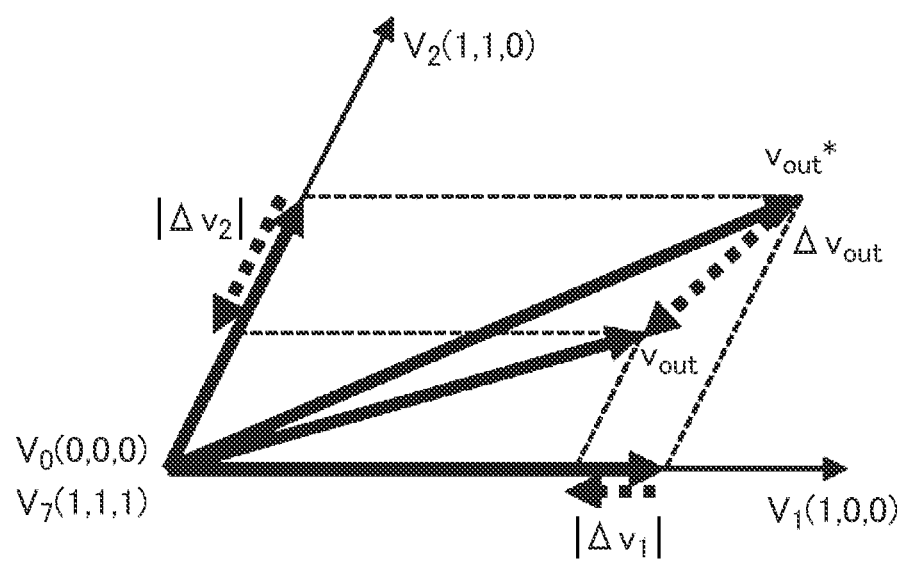
FIG. 6 is a voltage vector diagram showing an example of output voltage error vector $\Delta V_x$.

FIG. 6 is a voltage vector diagram showing an example of the output voltage error vector $\Delta V_x$ calculated by the output voltage error calculation unit 70 in step S4 described above. Also, in the example of FIG. 6, such case is assumed that an output voltage command vector $v_{out}^*$ which is the vector sum of the voltage command values $v_u^*$, $v_v^*$, $v_w^*$ of each of the U, V, and W phases in a certain period is within a range surrounded by the $V_1$ vector and the $V_2$ vector. In this case, first, the magnitude $|\Delta V_1|$ of the output voltage error vector generated in the period $T_1$ when the inverter circuit 100 outputs the $V_1$ vector as the output voltage vector $V_x$ is obtained by the expression (2) below by substituting the value of the input current $i_{dc}$ ($i_{dc}=i_u$) obtained from the table of FIG. 5 into the expression (1) described above.

$$\Delta V_1 = R_{ESR} \times i_u \times T_1 \quad (2)$$

In a similar manner, the magnitude $=\Delta V_2|$ of the output voltage error vector generated in the period $T_2$ when the inverter circuit 100 outputs the $V_2$ vector as the output voltage vector $V_x$ is obtained by the expression (3) below.

$$\Delta V_2 = R_{ESR} \times (-i_w) \times T_2 \quad (3)$$

On the other hand, in the period $T_0$ when the $V_0$ vector is outputted and the period $T_7$ when the $V_7$ vector is outputted, since the current does not flow through the DC power supply 300, the input voltage $V_{dc}$ of the inverter circuit 100 does not change, and the output voltage error vector is not generated. Therefore, as shown in FIG. 6, the output voltage error $\Delta v_{out}$ generated during the control period in question (during the carrier period) becomes the vector sum of the output voltage error vector $\Delta V_1$ and the output voltage error vector $\Delta V_2$. As a result, the output voltage $v_{out}$ of the inverter circuit 100 becomes the vector sum of the output voltage command vector $v_{out}^*$ and the output voltage error $\Delta v_{out}$, and, as it is, the voltage in accordance with the command is not outputted.

In the control device 1 of the present embodiment, the voltage command compensation amounts $V_{ucomp}$, $V_{vcomp}$, $V_{wcomp}$ of each phase calculated by the output voltage error calculation unit 70 in step S5 of FIG. 4 are added to the voltage command values $v_u^*$, $v_v^*$, $v_w^*$ of each phase respectively in the PWM signal generation unit 40. Thus, the output voltage error $\Delta v_{out}$ which is the vector sum of the output voltage error vector $\Delta V_x$ calculated in step S4 is added to the output voltage command vector $v_{out}^*$ beforehand. Therefore, feedforward compensation of the output voltage command value can be achieved.

According to the first embodiment of the present invention explained above, actions and effects described below are exhibited.

(1) The control device 1 controls the inverter circuit 100, calculates the input current $i_{dc}$ of the inverter circuit 100 based on the d-axis current command value $i_d^*$ and the q-axis current command value $i_q^*$ which are the output current command values for controlling the output current of the inverter circuit 100, and calculates the U-phase voltage command compensation amount $V_{ucomp}$, the V-phase voltage command compensation amount $V_{vcomp}$, and the W-phase voltage command compensation amount $V_{wcomp}$ which are the output voltage compensation amounts according to the variation amount of the input voltage $V_{dc}$ of the inverter circuit 100 based on the input current $i_{dc}$ having been calculated. By doing so, the response performance of control of the inverter circuit 100 can be improved.

(2) The control device 1 presumes the internal resistance value $R_{ESR}$ of the DC power supply 300 supplying DC power to the inverter circuit 100 (Step S3), and calculates the output voltage error vector $\Delta V_x$ expressing the variation amount of the input voltage $V_{dc}$ based on the product of the internal resistance value $R_{ESR}$ having been presumed and the input current ide (step S4). By doing so, even when the internal resistance value $R_{ESR}$ changes according to the state of the DC power supply 300 and the variation amount of the input voltage $V_{dc}$ changes accompanying it, the variation amount of the input voltage $V_{dc}$ can be obtained precisely.

(3) In step S3, the control device 1 presumes the internal resistance value $R_{ESR}$ of the DC power supply 300 based on the internal resistance value set beforehand for each state of the DC power supply 300. By doing so, the internal resistance value $R_{ESR}$ in accordance with the state of the DC power supply 300 can be presumed precisely.

(4) The control device 1 calculates the output voltage error vector $\Delta V_x$ expressing the variation amount of the input voltage $V_{dc}$ in step S4 for each output voltage vector $V_x$ expressing the combination of the state of turning on or off of the switching elements 110a to 110f of each phase included in the inverter circuit 100, and calculates the voltage command compensation amounts $V_{ucomp}$, $V_{vcomp}$, $V_{wcomp}$ of each phase (step S5). By doing so, the output voltage compensation amount can be calculated so that the error of the output voltage generated during each control period according to the operation state of the inverter circuit 100 can be surely compensated.

(5) The control device 1 includes the current command arithmetic unit 10, the dq axis current control unit 20, the coordinate conversion unit 30, the PWM signal generation unit 40 generating a switching signal that is for controlling turning on/off of the switching elements 110a to 110f of each phase included in the inverter circuit 100, and the output voltage error calculation unit 70. The current command arithmetic unit 10 calculates the d-axis current command value $i_d^*$ and the q-axis current command value $i_q^*$ which are the output current command values of the inverter circuit 100. The dq axis current control unit 20 and the coordinate conversion unit 30 calculates the U-phase voltage command value $v_u^*$, the V-phase voltage command value $v_v^*$, and the W-phase voltage command value $v_w^*$ which are the output voltage command values of the inverter circuit 100 based on the d-axis current command value $i_d^*$ and the q-axis current command value $i_q^*$ calculated by the current command arithmetic unit 10. The PWM signal generation unit 40 generates a switching signal based on the voltage command values $v_u^*$, $v_v^*$, and $v_w^*$ of each phase calculated by the dq axis current control unit 20 and the coordinate conversion unit 30. The output voltage error calculation unit 70 calculates the voltage command compensation amounts $V_{ucomp}$, $V_{vcomp}$, and $V_{wcomp}$ of each phase based on the current command values $i_u^*$, $i_v^*$, $i_w^*$ of each phase and the voltage command values $v_u^*$, $v_v^*$, and $v_w^*$ of each phase outputted from the coordinate conversion unit 31 based on the d-axis current command value $i_d^*$ and the q-axis current command value $i_q^*$. Here, the PWM signal generation unit 40 compensates the voltage command values $v_u^*$, $v_v^*$, $v_w^*$ of each phase based on the voltage command compensation amounts $V_{ucomp}$, $V_{vcomp}$, $V_{wcomp}$ of each phase calculated by the output voltage error calculation unit 70, and generates a switching signal. By doing so, feedforward compensation of the output voltage command value with respect to the inverter circuit 100 can be achieved while properly controlling the inverter circuit 100.

Second Embodiment

Figure 7:
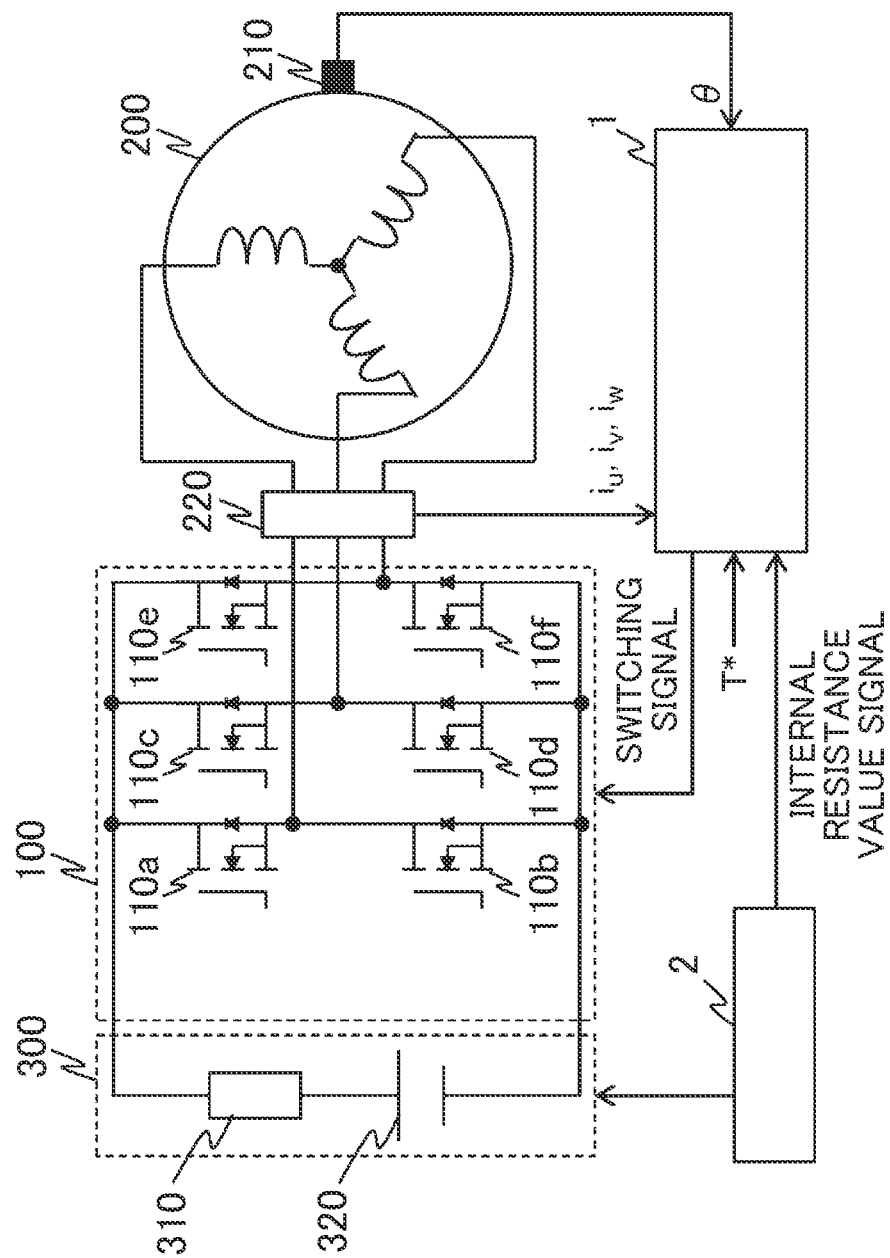
FIG. 7 is a drawing showing a configuration of a motor drive system including a control device related to the second embodiment of the present invention.

FIG. 7 is a drawing showing a configuration of a motor drive system including a control device related to the second embodiment of the present invention. Compared to the motor drive system of FIG. 1 explained in the first embodiment, the motor drive system shown in FIG. 7 is different in terms that a power supply control device 2 controlling the DC power supply 300 is arranged. The power supply control device 2 controls charging/recharging of the DC power supply 300, detects the resistance value $R_{ESR}$ of the internal resistance 310 in the DC power supply 300, and outputs an internal resistance value signal expressing the resistance value $R_{ESR}$ to the control device 1.

In the present embodiment, the control device 1 presumes the resistance value $R_{ESR}$ of the internal resistance 310 included in the DC power supply 300 based on the internal resistance value signal outputted from the power supply control device 2 in step 3 of FIG. 4 when the voltage command compensation amounts $V_{ucomp}$, $V_{vcomp}$, $V_{wcomp}$ of each of the U, V, and W phases are calculated by the output voltage error calculation unit 70. With respect to the points other than this, processes similar to those explained in the first embodiment are executed.

According to the second embodiment of the present invention explained above, in step S3, the control device 1 presumes the internal resistance value $R_{ESR}$ of the DC power supply 300 based on the internal resistance value signal outputted from the power supply control device 2 controlling the DC power supply 300. By doing so, since the internal resistance value $R_{ESR}$ of the DC power supply 300 detected by the power supply control device 2 is transferred to the control device 1 as the internal resistance value signal, even when the internal resistance value $R_{ESR}$ may change by the operation state of the DC power supply 300, the internal resistance value $R_{ESR}$ can be presumed precisely, and the variation amount of the input voltage $V_{dc}$ can be calculated accurately.

Third Embodiment

Next, the third embodiment of the present invention will be explained. In the present embodiment, an application example to an electric vehicle system will be explained.

Figure 8:
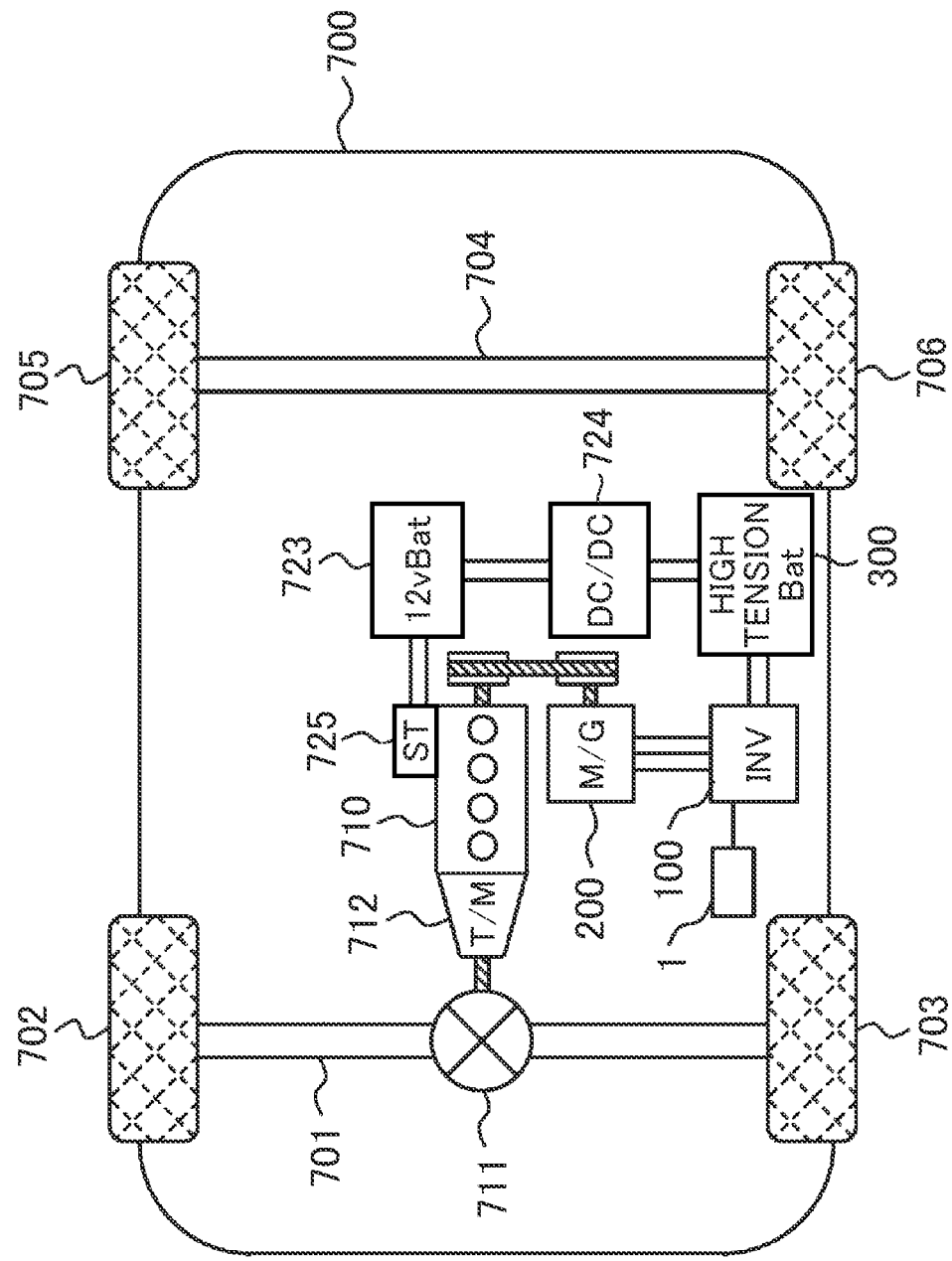
FIG. 8 is a drawing showing a configuration of an electric vehicle system related to the third embodiment of the present invention.

FIG. 8 is a drawing showing a configuration of an electric vehicle system related to the third embodiment of the present invention. The electric vehicle system shown in FIG. 8 is mounted on a body 700 of a hybrid electric automobile, and includes the motor drive system explained in the first and second embodiments respectively. In the electric vehicle system of the present embodiment, the inverter circuit 100 is operated based on the switching signal outputted from the control device 1, and executes power conversion from DC power to AC power. The motor 200 is driven using AC power outputted from the inverter circuit 100. Thus, the electric vehicle system can travel using a drive force of the motor 200.

Also, in the electric vehicle system of the present embodiment, the motor 200 acts not only as a motor generating a rotational drive force but also as a generator receiving a drive force and generating power. That is to say, the electric vehicle system of FIG. 8 includes a power train to which the motor 200 is applied as a motor/generator.

A front wheel axle 701 is pivotally supported by the front portion of the body 700 in a rotatable manner, and front wheels 702, 703 are arranged at both ends of the front wheel axle 701. A rear wheel axle 704 is pivotally supported by the rear portion of the body 700 in a rotatable manner, and rear wheels 705, 706 are arranged at both ends of the rear wheel axle 704. At the center portion of the front wheel axle 701, a differential gear 711 that is a power distribution mechanism is arranged, and it is configured that a rotational drive force transmitted from an engine 710 through a transmission 712 is distributed to the front wheel axle 701 of the left and right.

With respect to the engine 710 and the motor 200, a pulley arranged on a crankshaft of the engine 710 and a pulley arranged on a rotary shaft of the motor 200 are mechanically connected to each other through a belt 730. Thus, it is configured that a rotational drive force of the motor 200 is transmitted to the engine 710 and a rotational drive force of the engine 710 is transmitted to the motor 200 respectively.

With respect to the motor 200, by supply of three-phase AC power controlled by the inverter circuit 100 to a stator coil of a stator, the rotor rotates, and a rotational drive force according to the three-phase AC power is generated. That is to say, the motor 200 is controlled by the inverter circuit 100 and operates as a motor. On the other hand, the rotor rotates receiving the rotational drive force of the engine 710, thereby an electromotive force is induced in the stator coil of the stator, and the motor 200 operates as a generator generating three-phase AC power.

The inverter circuit 100 is a power conversion device converting DC power supplied from the DC power supply 300 that is a high-tension (42V or 300V for example) system power supply to three-phase AC power, and controls three-phase AC current flowing through the stator coil of the motor 200 matching the magnetic pole position of the rotor according to the operation command value.

The three-phase AC power generated by the motor 200 is converted to DC power by the inverter circuit 100, and charges the DC power supply 300. The DC power supply 300 is electrically connected to a low-tension battery 723 through a DC-DC converter 724. The low-tension battery 723 configures a low-tension (12V for example) system power supply of an automobile, and is used for a power supply of a starter 725 for initial start-up (cold start-up) of the engine 710, an auxiliary group such as a radio and a light, and so on.

In a case a vehicle is stopping (idle stop mode) such as waiting at a traffic light, when the engine 710 is to be stopped and is to be restarted (hot start-up) in restarting the vehicle, the motor 200 is driven by the inverter circuit 100, and the engine 710 is restarted. However, when the amount of charge of the DC power supply 300 is insufficient or when the engine 710 has not been warmed up sufficiently and so on, even in the idle stop mode, it is preferable not to stop the engine 710 but to continue driving of the engine 710. Also, during the idle stop mode, it is necessary to secure a drive source of an auxiliary machine group whose drive source is the engine 710 such as a compressor of an air conditioner. In this case, it is also possible to drive the motor 200 instead of the engine 710 to be used as the drive source of the auxiliary machine group.

On the other hand, when a vehicle is in the acceleration mode or the high load operation mode, the motor 200 is driven to assist driving of the engine 710. To the contrary, in the charging mode when charging of the DC power supply 300 is necessary, the motor 200 is made to generate power by the engine 710 and the DC power supply 300 is charged. Also, when the vehicle is to be braked or decelerated and so on, the regeneration mode is applied and it is possible that the motor 200 is made to generate power by kinetic energy of the vehicle and the DC power supply 300 is charged.

According to the third embodiment of the present invention explained above, the electric vehicle system includes the control device 1, the inverter circuit 100 controlled by the control device 1 and converting DC power to AC power, and the motor 200 that is driven using AC power outputted from the inverter circuit 100. By doing so, it is possible to construct an electric vehicle system having high response performance of control in being driven by the motor 200.

The embodiments and various modifications explained above are examples only, and the present invention is not to be limited to the content of them as far as the feature of the present invention is not spoiled. Further, although various embodiments and modifications were explained above, the present invention is not to be limited to the content of them. Other aspects that can be considered within the range of the technical thought of the present invention also are to be included within the range of the present invention.

The disclosure of the following priority right basic application is hereby incorporated herein by reference.

Japanese Patent Application No. 2019-137903 (applied on Jul. 26, 2019)

LIST OF REFERENCE SIGNS

1: Control device
2: Power supply control device
10: Current command arithmetic unit
20: dq axis current control unit
30, 31: Coordinate conversion unit
40: PWM signal generation unit
50: dq conversion unit
60: Velocity conversion unit
70: Output voltage error calculation unit
100: Inverter circuit
110a: U-phase upper arm switching element
110b: U-phase lower arm switching element
110c: V-phase upper arm switching element
110d: V-phase lower arm switching element
110e: W-phase upper arm switching element
110f: W-phase lower arm switching element
200: Motor
210: Position sensor
220: Current sensor
300: DC power supply
310: Internal resistance
320: Voltage source

The invention claimed is:

1. A control device executing control of an inverter circuit, wherein
   an input current of the inverter circuit is calculated based on an output current command value that is for controlling an output current of the inverter circuit, and
   an output voltage compensation amount depending on a variation amount of input voltage of the inverter circuit is calculated based on the input current calculated.

2. The control device according to claim 1, wherein
   an internal resistance value of a power supply supplying DC power to the inverter circuit is presumed, and
   a variation amount of the input voltage is calculated based on a product of the internal resistance value presumed and the input current.

3. The control device according to claim 2, wherein
   an internal resistance value of the power supply is presumed based on an internal resistance value having been set beforehand for each state of the power supply.

4. The control device according to claim 2, wherein
   an internal resistance value of the power supply is presumed based on an internal resistance value signal outputted from a power supply control device controlling the power supply.

5. The control device according to claim 1, wherein
   a variation amount of the input voltage is calculated and the output voltage compensation amount is calculated for each combination of a state of turning on or turning off of switching elements of respective phases included in the inverter circuit.

6. The control device according to claim 1, comprising:
a current command arithmetic unit calculating the output current command value;
a current control unit calculating an output voltage command value of the inverter circuit based on the output current command value calculated by the current command arithmetic unit;
a PWM signal generation unit generating a switching signal that is for controlling of on/off of switching elements of respective phases included in the inverter circuit based on the output voltage command value calculated by the current control unit, and
an output voltage error calculation unit calculating the output voltage compensation amount based on the output current command value and the output voltage command value, wherein
the PWM signal generation unit compensates the output voltage command value based on the output voltage compensation amount calculated by the output voltage error calculation unit, and generates the switching signal.

7. An electric vehicle, comprising:
the control device according to claim 1;
an inverter circuit that is controlled by the control device and converts DC power to AC power; and
a motor that is driven using the AC power outputted from the inverter circuit.

* * * * *